3,342,751
METHOD OF CATALYST PREPARATION
John C. Hayes, Palatine, Ill., assignor to Universal Oil
 Products Company, Des Plaines, Ill., a corporation of
 Delaware
No Drawing. Filed Feb. 7, 1964, Ser. No. 343,231
5 Claims. (Cl. 252—466)

ABSTRACT OF THE DISCLOSURE

A method of activating alumina with nickel, followed by calcining at below 1200° F. and subsequent reduction with hydrogen at above 1200° F.

---

This invention relates to the catalytic production of hydrogen and more specifically to the use of a specially treated improved catalyst for effecting the decomposition of a hydrocarbon charge stream to produce a high yield of hydrogen with a minimum of carbon oxides contamination in the product stream.

Hydrocarbon oils and gases, such as are readily and abundantly available from petroleum processing operations, provide an excellent source of hydrogen and as a result improved processing steps have been designed to effect the conversion of such hydrocarbons to hydrogen. Normally, gaseous hydrocarbons, such as methane, are considered to be a particularly attractive source of hydrogen because of the high ratio of hydrogen to carbon. Further, the catalytic decomposition of hydrocarbons to hydrogen provides for optimum yields and an advantageous method of effecting hydrogen production, with suitable catalysts including supported platinum and iron group metals. In connection with prior associated development work, it has been found that catalysts which embody nickel, rather than iron, and in addition have a base or support material of a high alumina content provide a decomposition process with better yields and higher hydrogen purity. Also, of particular concern, in an optimum operation, is the elimination of the contamination of the hydrogen product stream with carbon monoxide and carbon dioxide. Thus, considerable work has been done in the direction of reducing the total carbon oxides production in the decomposition processing. Generally, the more active catalysts have been found to give the lowest levels of carbon monoxide production.

At the same time and in conjunction with test work carried out to determine various catalyst composites for use in effecting the fluidized contacting and decomposition of a methane stream, there has been a study of catalyst pretreatment procedures. As a result of these pretreatment studies, there has been found that variations in initial calcination and reduction operations do materially effect catalyst activity and product stream purity. For example, it appears that a low oxidation or calcination temperature is preferable to a high one. Also, it has been found that high reducing temperatures are desirable in providing an optimum form of active decomposition catalyst.

It is thus a principal object of the present invention to provide for the decomposition of a hydrocarbon stream with a subdivided catalyst which has been prepared by the nickel activation of a predominantly alumina support material and the composite pretreated in a manner providing a relatively low calcination temperature and a relatively high reduction temperature.

It is also an object of the present invention to carry out a pretreatment procedure where the reduction step follows the calcination step and the oxidizing temperature is at a level generally less than 1200° F., while the reduction temperature is preferably above 1200° F.

In a broad aspect, the present invention provides a method for catalytically decomposing a gaseous hydrocarbon charge stream to produce hydrogen and carbon which comprises, effecting the contacting of such stream at high temperature decomposition conditions with a subdivided alumina-nickel catalyst prepared by the activation of a refractory, predominantly alumina, metal oxide base with nickel and then subjecting the resulting composite to a low temperature calcination of less than about 1200° F. and to a subsequent high temperature reduction above about 1200° F.

Prior associated work has shown that an alumina-nickel catalyst is preferable to a silica-alumina-nickel catalyst, particularly where the silica comprises a major proportion of the composite. Thus, although alumina may serve as the support for the nickel or the active catalyst component, its primary value lies in its contribution to the overall activity of the catalyst composite in effecting a high yield of hydrogen in the decomposition of the normally gaseous hydrocarbon stream. The activity of the catalyst composite may in part result in an independent effect exerted by the alumina or more preferably the activity may result by reason of a particular association of the alumina with nickel as the preferred active component.

An illustrative showing of the advantage of the high alumina content catalyst is the following comparative data which was obtained from laboratory research work in connection with various catalyst compositions. In all cases the catalyst was in a microsperical form and was utilized to contact a methane charge stream at decomposition conditions with a reactor temperature of the order of 1600° F.

| Support Description | Active Metal Component | Maximum CH₄ Conversion | CO+CO₂ in Product |
|---|---|---|---|
| 96% Al₂O₃—4% SiO₂ | 10% Ni | 89% | 1.5% |
| 92% Al₂O₃—8% SiO₂ | 10% Ni | 82% | 2.5% |
| 88% Al₂O₃—12% SiO₂ | 10% Ni | 71% | 2.5% |
| 65% Al₂O₃—35% SiO₂ | 10% Ni | 65% | 6.0% |
| 52% Al₂O₃—48% SiO₂ | 10% Ni | 54% | 9.5% |

The alumina for the support may be synthetically prepared or may be of a naturally occurring alumina such as is recovered from bauxite. Synthetically prepared alumina may be of the gel type generally prepared by precipitation methods. For example, an alkaline reagent such as ammonium hydroxide, ammonium carbonate, etc., is commingled with an acidic solution of an aluminum salt, which may be an aqueous solution of aluminum chloride, aluminum sulfate, aluminum nitrate and the like, to precipitate the desired alumina. Alternatively, alumina may be precipitated by commingling hydrochloric acid, sulfuric acid, nitric acid, or the like with an alkaline solution of a suitable aluminum salt such as sodium aluminate, potassium aluminate, etc. The silica content of the carrier may be obtained by coprecipitation with the alumina. For example, a solution of sodium silicate may be formed into a sol to admix with an alumina sol to provide an alumina-silica composite gel.

Where alumina or an alumina-silica base is desired in a spherical, or micro-spherical form, another suitable method of preparing and forming the alumina comprises digesting aluminum in an acid, such as hydrochloric acid at a controlled pH, and discharging a resulting sol through dropping tips or by means of a spray nozzle or rotating disc, into a water immiscible suspending medium, such as oil, and forming firm gel particles during passage therethrough. Silica or other inorganic oxides may be added to the alumina while it is in the sol or gel form prior to the sphere formation. The spheres may be removed from the bath in any suitable manner such as by a stream of water disposed beneath the oil layer. The spheres are thereafter dried in the same manner as described for the previous preparations. In still another type of operation for producing alumina or an alumina-silica composite in a microspherical support form for use in fluidized operations, the gel may be processed through a spray dryer or a spinning disc arrangement which will form microspheres or macrospheres of a desired size.

Regardless of the source or method of preparation, the dried alumina support is usually subjected to calcination at a temperature of at least 900° F., and generally at a temperature of from about 900° F. to about 1500° F., to yield a substantially anhydrous alumina. A particularly preferred calcination temperature is from about 1100° F. to about 1300° F. The calcination may be effected in any suitable atmosphere. Usually the calcination may be effected in the presence of air or other oxidizing media, although in some cases it may be effected in a reducing atmosphere such as hydrogen, or an inert atmosphere such as nitrogen. The time of calcination will vary with the temperature of calcination. Generally, the time of calcination will be from about 0.5 to about 10 hours.

In a somewhat more specific embodiment, the present invention provides a method for catalytically decomposing a gaseous hydrocarbon charge stream to produce hydrogen and carbon in a manner which comprises, effecting the contacting of such stream at a high temperature decomposition temperature above about 1400° F. with subdivided alumina nickel catalyst prepared by commingling a refractory metal oxide base comprising more than 95% alumina, with a nickel salt to provide a resulting finished composite containing from about 5% to about 20% nickel by weight thereof, and then subjecting the composite to drying and to a low temperature calcination of less than about 1200° F. and a subsequent high temperature reduction above about 1200° F.

The improved nickel-containing catalyst of this invention may be prepared by impregnating the alumina or alumina-silica support with a suitable aqueous solution of a nickel salt, as, for example, nickel nitrate, nickel formate, or an acid salt such as nickel chloride and nickel sulfate with an ammoniacal solution which will convert the salt to the metal oxide, followed by heating to drive-off the volatile components. There may be successive dippings of the support into the impregnating solution or there may be a continuous soaking for a period of one or more hours until the particular type of support acquires the desired amount of the active metal component which will be retained after rinsing and drying of the composite. The nickel component may also be commingled with the support by co-precipitation methods or by adding a nickel salt solution to the hydrogel slurry feed to spray drying or comminuting equipment, such that the nickel content is incorporated into the resulting sprayed microspheres.

The impregnated catalyst, in accordance with the present invention, is first calcined or oxidized at a low level of the order of 600° F., although with some bases it may be in a range up to 1200° F. This oxidation step should be carried out for at least about two hours, but may be for a period of from 1 to 10 hours or more, depending upon the particular base material. The temperature range may also vary, starting at say 300° F. and ending at 600° F. or up to 1200° F. The oxidation temperature may be determined to some degree by the type of nickel salt used for commingling with the alumina. In other words, it is necessary to have the oxidation temperature high enough or the oxidation period sufficient to decompose the nickel salt onto the support. Following the calcination step, the composite is then pretreated with a reduction step in the presence of hydrogen at a high temperature level which should be above about 1200° F. and generally of the order of 1600° F. or more for at least a one hour period.

Associated work has also found that iron contamination is a particularly troublesome ingredient, since it may enter into the catalyst composition from the raw materials providing the forms of the catalyst support or it may enter into the catalyst stream from equipment being utilized in the catalyst preparation. For example, iron may enter the composition from treating chambers, pipelines, spray driers, calcining furnaces, conveyor belts and the like. Thus, in a still more specific embodiment of the present invention, there is provided a method for catalytically decomposing a gaseous hydrocarbon charge stream to produce hydrogen and carbon, which comprises, effecting the contact of such stream at a decomposition temperature above about 1400° F. with a subdivided alumina-nickel-catalyst containing less than about 0.1% by weight of iron and prepared by the commingling of a refractory, essentially alumina and iron free metal oxide base with a nickel salt to provide a resulting finished composite containing from about 5% to about 20% nickel by weight thereof, and then subjecting the composite to drying and to a low temperature calcination of less than about 1200° F. and a subsequent high temperature reduction above about 1200° F.

The conversion of normally gaseous hydrocarbons is effected in accordance with the present process by contacting said hydrocarbons with the above described improved catalyst composite at a decomposition reaction temperature from about 1400° F. to about 1700° F. or more. Pressure should be kept to a minimum; however, in a fluidized operation it may be necessary to use low superatmospheric pressure to effect a process flow between processing chambers.

The present hydrogen producing process is directed to the use of finely divided particles in a fluidized system, but may be effected in any conventional or otherwise convenient manner. One method comprises locating the catalytic composite in a fixed bed within a reactor. The hydrocarbon charge is passed therethrough at the desired decomposition reaction temperature, in either upward or downward flow, and the reactor effluent is withdrawn from the reactor at a rate which will insure an adequate residence time therein. In this type of operation, the hydrocarbon charge is periodically alternated with a flow of air, or other oxygen-containing gas, to effect a controlled burning of the carbon deposits from the catalyst composite.

A preferred continuous method of effecting the improved process of this invention utilizes a separate reactor and regenerator, and comprises a repeatable cycle whereby the catalytic composite is continuously passed through the reactor countercurrent or concurrent to the hydrocarbon charge. The catalytic composite is thereafter circulated through the regenerator countercurrently or concurrently with a stream of air or other oxygen-containing gas, whereby the carbon is burned from the catalyst and the resulting hot regenerated catalyst is circulated to the reactor to contact further quantities of the hydrocarbon to complete the cycle.

Other suitable methods include the moving bed type of operation, in which the hydrocarbon charge is passed concurrently or countercurrently to a moving catalyst bed, and the fluidized system in which the hydrocarbon is charged in an upflow with entrained catalyst or passed through a dense catalyst phase bed in a reactor in order to maintain the catalyst in a state of turbulence under hindered settling conditions.

The following examples are presented to illustrate the improved process of this invention, utilizing a varying pretreatment step for the catalyst composite; however, such examples are for the purpose of illustration only and are not intended to limit the scope of the invention.

*Example I*

A quantity of microspherical catalyst particles comprising approximately 40 cc. was utilized in a small quartz reactor sized approximately 2″ I.D. and 8″ in length to contact a methane charge stream in a fluidized contact. The catalyst consisted of a support which was 95% alumina and 5% silica with an added active metal component comprising nickel in an amount of 5% by weight of the composite. After the nickel impregnation, the washed and dried composite was subjected to a 1700° F. calcination for a two hour period. The calcined catalyst was subsequently subjected to a reduction step in the presence of hydrogen at a temperature of 570° F. for a one hour period.

In the test procedure, the methane was introduced into the reactor at a gaseous hourly space velocity of about 6,000 to effect contacting of the catalyst at about 1600° F. for 12 second periods. Actually, the testing method used a continuous cyclic operation with the catalyst being subjected to a nitrogen purge stream after effecting the methane conversion for approximately 18 seconds and then subjected to oxidation by an air stream for approximately 25 seconds to effect substantial removal of the carbon content on the catalyst. Following the oxidation step, the catalyst was again subjected to nitrogen purge stream before having a methane charge again introduced for conversion.

In the test run for the present catalyst, there was a methane conversion of 78.5% at the end of 12 hours of operation of the catalyst and a total $CO+CO_2$ production of 8.0%.

*Example II*

In this example, a similar type of alumina-silica-nickel catalyst composite was treated in the same test reactor under similar conditions except, however, that the catalyst composite was pretreated after impregnation to have a calcination treatment for about two hours at 1700° F. and a subsequent reduction step in the presence of hydrogen at a temperature of 1600° F. for one hour.

In the test run using the present form of catalyst, there was a 77.5% conversion of the methane and a total production of carbon oxides $(CO+CO_2)$ equal to 9.2%.

*Example III*

In this test, a similar type of alumina-silica nickel composite was prepared as described for Examples I and II, except, in this instance, the impregnated composite was pretreated by being first subjected to a low temperature oxidation at 570° F. and then subjected to reduction in the presence of hydrogen at a temperature of 1600° F. for one hour.

In this test run, the catalyst provided a methane conversion of 77.5% and a total production of carbon oxides of 3.5%.

A comparison of the foregoing examples shows that there is a significant affect on the purity of the hydrogen product stream by the lowering of the calcination temperature in the pretreatment of the catalyst composite. In other words, the catalyst of Example III shows the total carbon oxides lowered to a level of less than 4% for the test period while holding a conversion to the same point as the reference catalysts.

*Example IV*

In this test, an alumina-nickel catalyst composite was prepared for use in the test equipment by impregnating a powdered commercially available alumina, known as Alcoa's C–31 alumina. The base was impregnated with a nickel nitrate solution to provide a finished washed and dried composite with 10% nickel by weight thereof. The composite was then subjected to oxidation at 2000° F. temperature for a two hour period and then subsequently reduced, in the presence of hydrogen, for a one hour period at 1600° F.

Utilizing this catalyst in the test reactor in the cyclic operation, as described in Example I, there was a methane conversion of 62.0% and a total oxides production $(CO+CO_2)$ of 12.0%.

*Example V*

In another test, a quantity of C–31 alumina base was impregnated with 10% nickel in the same manner as set forth in Example IV; except, that in this instance, the washed and dried composite was subjected to a lower temperature pretreating calcination of 1200° F. The calcination was followed by a reduction treatment in the presence of hydrogen at 1600° F. for a one hour period.

In the test reactor, the present catalyst provided a methane conversion of 84.0% and a total oxides production of 3.0%.

A comparison of the results obtained in these last two test operations also shows that there is a large reduction in the amount of carbon oxides produced in connection with methane decomposition to produce hydrogen and carbon. The lowering of the oxidation temperature for the catalyst treatment from 2000° F. to 1200° F., in this instance, was effective to aid product purity by actually reducing the total carbon oxides from 12% to 3%. It should, of course, be understood that the foregoing examples show data that point out the particular advantage of properly controlled catalyst pretreating procedures; however, still lower carbon oxides formation and greater product purity can be achieved by other catalyst modifications or processing changes.

I claim as my invention:

1. A method for preparing a catalyst which comprises activating a refractory, predominantly alumina base with nickel and then subjecting the composite to drying and to a low temperature calcination of less than 1200° F. and a subsequent high temperature reduction in the presence of hydrogen at above about 1200° F.

2. A method for preparing a catalyst which comprises commingling of a refractory, predominantly alumina base with a nickel salt to provide a resulting finished composite containing from about 5% to about 20% nickel by weight thereof, and then subjecting the composite to drying and to a low temperature calcination of less than 1200° F. and a subsequent high temperature reduction in the presence of hydrogen at above about 1200° F.

3. A method for preparing a catalyst which comprises spray drying a predominantly alumina hydrogel slurry to form finely divided microspherical particles which are more than 95% alumina, impregnating the particles with a nickel salt to provide a resulting finished composite containing from about 5% to about 20% nickel by weight thereof, and then subjecting the composite to drying and to a low temperature calcination in the presence of air at a temperature less than 1200° F. and a subsequent high temperature reduction in the presence of hydrogen at above about 1200° F.

4. A method for preparing a catalyst which comprises comminuting a predominantly alumina hydrogel slurry having commingled therewith a nickel salt in an amount to provide a resulting finished composite containing from about 5% to about 20% nickel by weight thereof, collecting resulting comminuted composite particles and washing and drying them, and then subjecting them to a low temperature calcination in the presence of air at a temperature less than 1200° F. and a subsequent high temperature reduction in the presence of hydrogen at above about 1200° F.

5. A method for preparing a catalyst which comprises impregnating a refractory, essentially alumina and iron-free base with a nickel salt to provide a resulting finished composite containing from about 5% to about 20% nickel by weight thereof, and then subjecting the composite to drying and to a low temperature calcination of less than 1200° F. and a subsequent high temperature reduction in the presence of hydrogen at above about 1200° F.

References Cited

UNITED STATES PATENTS 3,129,060  4/1964  Pohlenz _____ 23—212

OSCAR R. VERTIZ, *Primary Examiner.*

EDWARD STERN, *Examiner.*